Feb. 2, 1960 W. WATERMAN 2,923,277
CONTROLS FOR ADJUSTING STROKE OF HYDRAULIC PISTONS AND THE LIKE
Filed Dec. 15, 1955 3 Sheets-Sheet 1

INVENTOR
WILLIAM WATERMAN
BY
ATTORNEY

Feb. 2, 1960 W. WATERMAN 2,923,277
CONTROLS FOR ADJUSTING STROKE OF HYDRAULIC PISTONS AND THE LIKE
Filed Dec. 15, 1955 3 Sheets-Sheet 2
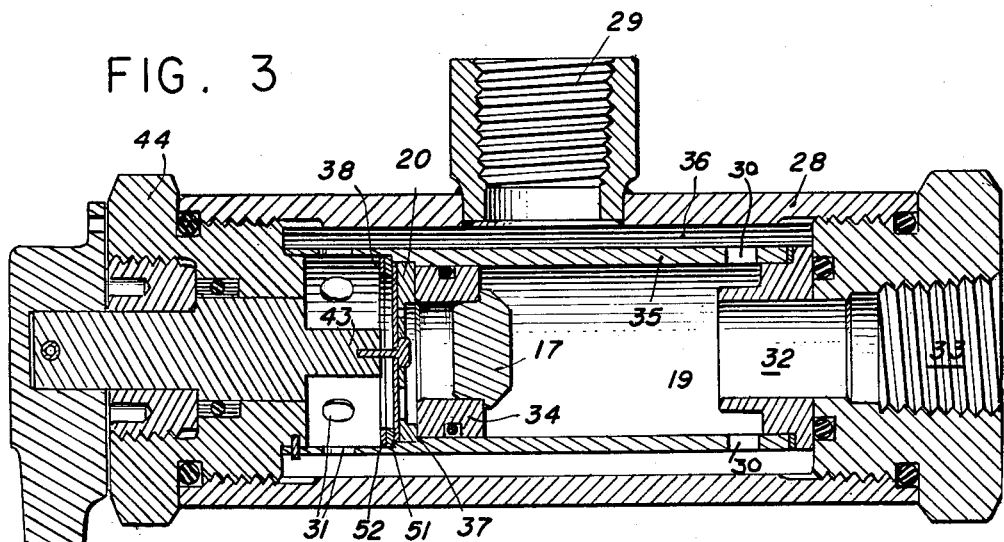
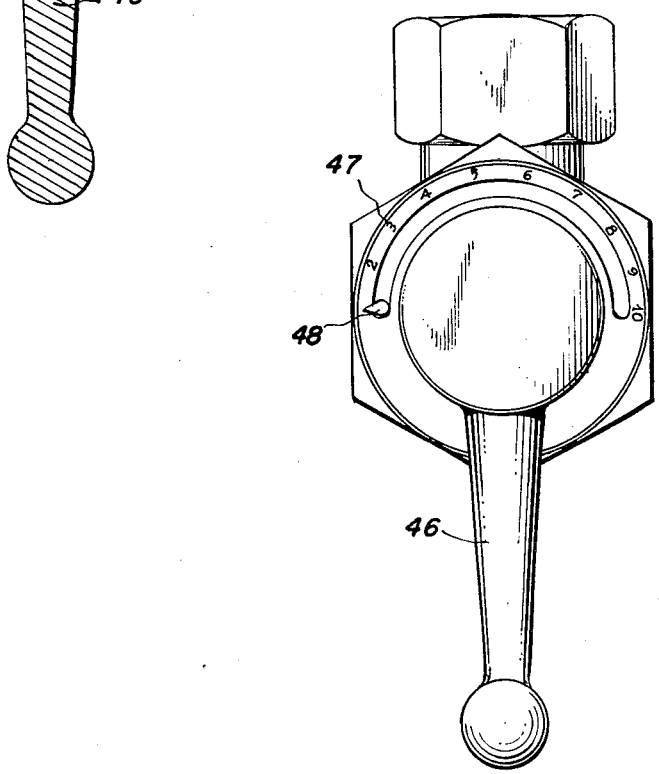
INVENTOR
WILLIAM WATERMAN
BY
ATTORNEY Feb. 2, 1960 W. WATERMAN 2,923,277
CONTROLS FOR ADJUSTING STROKE OF HYDRAULIC PISTONS AND THE LIKE
Filed Dec. 15, 1955 3 Sheets-Sheet 3

INVENTOR
WILLIAM WATERMAN
BY Roland C. Fehm
ATTORNEY

United States Patent Office 2,923,277
Patented Feb. 2, 1960

2,923,277

CONTROLS FOR ADJUSTING STROKE OF HYDRAULIC PISTONS AND THE LIKE

William Waterman, Wilmette, Ill.

Application December 15, 1955, Serial No. 553,232

4 Claims. (Cl. 121—38)

This invention relates to hydraulic apparatus for variably controlling the extent of movement of a hydraulically operated instrumentality and to an adjustable metering device for metering predetermined volumes of liquid.

Control of the movement of a hydraulic motor which actuates the instrumentality is effected automatically by controlling the volumes of pressure liquid employed to actuate the motor or displaced therefrom in its operation. For example, the stroke of a piston may be controlled by automatically controlling the volume of liquid introduced into the cylinder to operate the piston or that displaced by its movement.

The nature of the invention and further details thereof may be readily understood by reference to illustrative apparatus embodying the invention and shown in the accompanying drawings.

In said drawings:

Fig. 3 is a longitudinal section of a liquid metering device;

Fig. 4 is an elevation showing the adjustable control element of the metering device;

Figure 1:
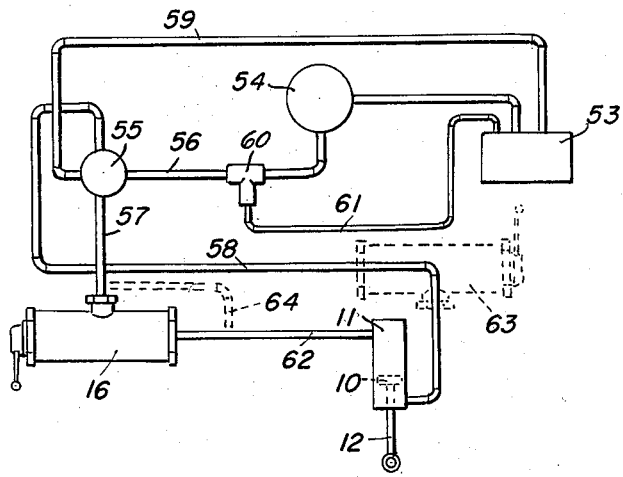
Fig. 1 is a diagram of an illustrative system wherein the hydraulic motor whose movement is controlled is a double acting piston and cylinder.

The piston 10 and cylinder 11 are representative of a common and well known form of a hydraulic motor. In the present instance the piston rod 12 is connected by appropriate means to the instrumentality or mechanism whose movement it is desired to control. For example, if the piston rod be employed to raise and lower a plow, by controlling the volume of liquid introduced into or displaced from cylinder 11, the plow may be lowered to a predetermined operating position and locked in such position by the hydraulic fluid in the cylinder. Yet the lowered or operative position of the plow may be easily adjusted simply by varying the volume of hydraulic fluid introduced into or displaced from the cylinder. For convenience, the term hydraulic motor or power unit will be used in a generic sense to include a reciprocating (e.g. piston and cylinder) as well as other forms of hydraulic motors such as a rotary motor.

Other examples are the lifting or lowering of loads. A special application is that of a lift truck wherein it is desired to lift the load platform hydraulically to a predetermined level. By controlling the volume of liquid introduced into the cylinder, the lift platform may be elevated to such a predetermined position and locked in such position by the hydraulic fluid confined in the operating cylinder. In other instances it may be desired to lower a load or device (acted on by gravity or other force) by a predetermined amount.

In cases such as the latter where the only tendency to move from a set position is in one direction, because of a constantly present force (such as the force of gravity in the case of raising or lowering the load), a single acting piston and cylinder 13 and 14 (such as that illustrated in Fig. 2) may be employed. The metered volume of liquid in cylinder 14 below the piston is sufficient to lock the piston rod 15 against movement in the direction in which the constantly present force tends to move it.

Though positively locked against movement by the hydraulic fluid confined inside the cylinder, the piston may be easily and quickly unlocked for movement by remote control simply by operating a control valve as will presently appear. Adjustment of the movement of the piston may be effected by remote control with equal ease and speed.

Figure 1A:
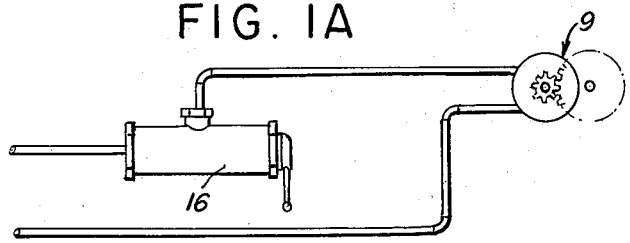
Fig. 1A is a fragmentary view of a system similar to that of Fig. 1, in which the power unit is a rotary hydraulic motor.

Other actuating means such as the hydraulic motor 9 of Fig. 1A, may be used in the system of Fig. 1 instead of a double acting piston.

The foregoing examples are merely illustrative. Many other uses for a controlled movement operating device with a positive lock will occur to those skilled in the art.

In general the extent of movement of the hydraulic motor may be controlled either by metering a predetermined volume of liquid into the motor or by metering said volume out of the motor. Since the hydraulic liquid (at the pressures here encountered) may be regarded as incompressible, cutting off of flow into or out of the motor serves to lock the latter in its set position against further movement. Where the motor acts against an ever present force, such as gravity, a single acting cylinder and piston may be used to advantage, since the volume of liquid locked in the cylinder in opposition to the force, in effect locks the piston against further movement. In such case, whether the predetermined volume is metered into or out of the cylinder depends on whether the movement it is desired to control is in the direction of the ever present force or in the opposite direction. In the case of a lift truck, for example, where the desired predetermined movement is up or against the ever present force, the predetermined volume of liquid is metered into the cylinder, as in Fig. 2. Where the predetermined movement is in the same direction as the ever present force, the predetermined volume of liquid is metered out of the cylinder, and in that case the metering device must be reversed from the position shown in Fig. 2.

Figure 5:
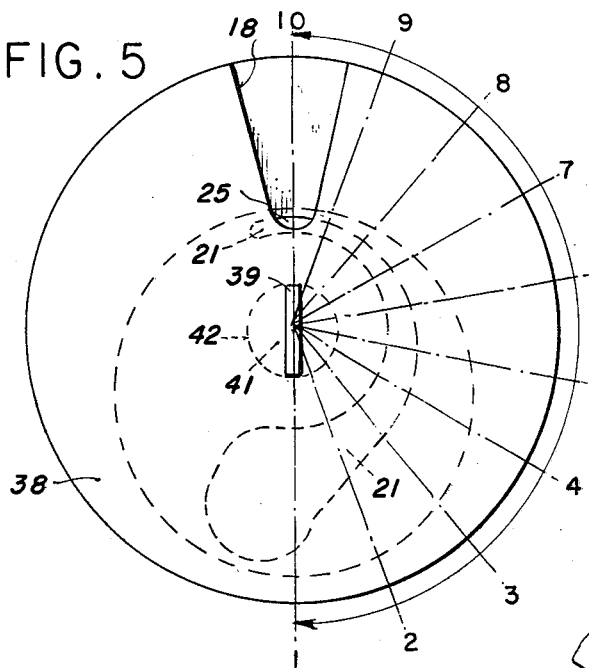
Fig. 5 is an elevation of the orifice control for the metering device.
Figure 8:
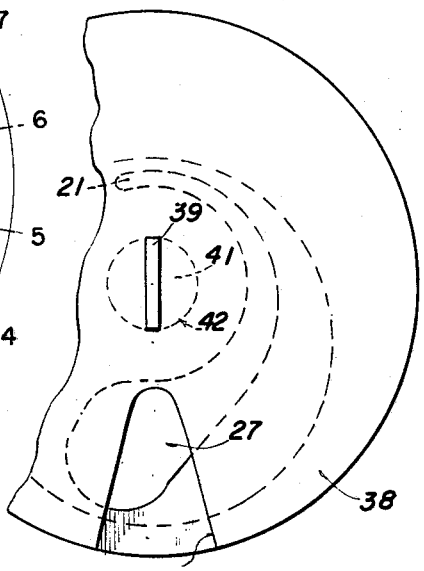
Figs. 7 and 8 are elevations similar to Fig. 5 showing different settings of the orifice control.
Figure 6:
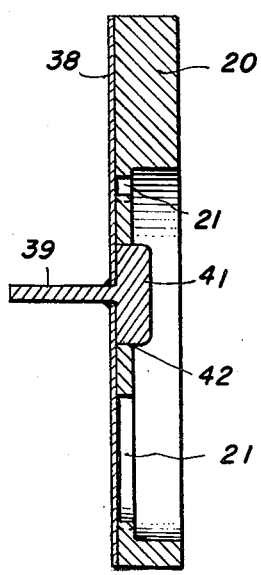
Fig. 6 is a section taken on the plane 6—6 of Fig. 7.
Figure 7:
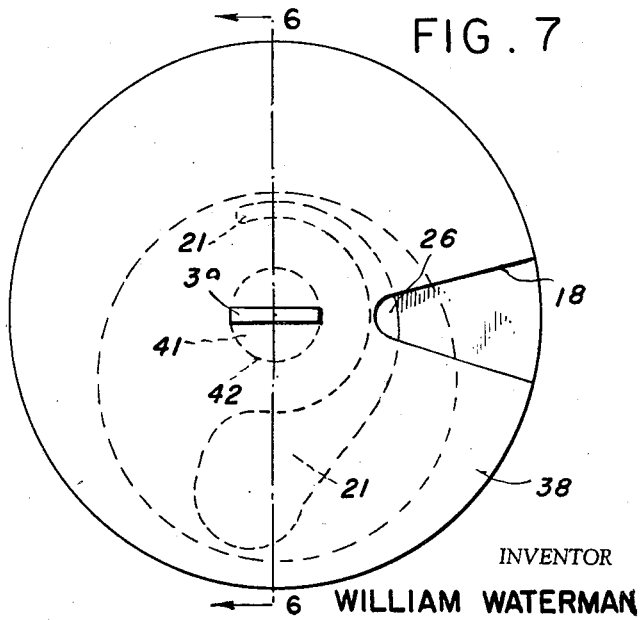

In the illustrative systems, the metering device for metering and controlling the volume of pressure liquid delivered to or displaced by the operating piston and cylinder or other hydraulic motor, is represented by the variable metering valve 16. For the aforesaid purposes metering through readily adjustable over a wide range, must be accurate. In the present metering device a valve 17 is moved by fluid flow at a rate determined by an adjustable metering orifice 18 (see Figs. 5–8) until it closes, in this case by seating, on seat 19, and shuts off further flow to the cylinder or other motor. The volume of flow and therefore the extent of movement of the motor and instrumentality actuated thereby, depends on the operative size of orifice 18. As here shown, the effective size of orifice 18 is adjusted by relative movement between orifice 18 and member 20 having therein an elongated slot 21 variably registering with orifice 18 and shaped to vary, in this case progressively, the effective size of orifice 18. In the present instance port 18 and member 20 are relatively rotatable and port 21 varies in width radially so that the effective size of the orifice opening permits a rate of flow which varies, for example, in linear proportion to the relative angular movement between orifice 18 and port 21. That is, for each increment of relative movement (rotation in this case) the effective size of the orifice varies so as to pass an equal increase in volume of liquid and vice versa. For example, Fig. 5 illustrates 10 positions having equal angular spacing and representing 10 different orifice openings which in succession increase the volume of flow by equal amounts and vice versa. Fig. 5 illustrates the minimum set orifice opening 25, Fig. 7 an intermediate opening 26; and Fig. 8 the maximum set orifice opening 27. This relationship may be expressed by the following table wherein $x$ and $y$ are constants:

| Valve Handle Position | Effective Orifice Area | Volume of Liquid |
|---|---|---|
| 10 | $1/10x$ | $10y$ |
| 9 | $1/9x$ | $9y$ |
| 8 | $1/8x$ | $8y$ |
| 7 | $1/7x$ | $7y$ |
| 6 | $1/6x$ | $6y$ |
| 5 | $1/5x$ | $5y$ |
| 4 | $1/4x$ | $4y$ |
| 3 | $1/3x$ | $3y$ |
| 2 | $1/2x$ | $2y$ |
| 1 | $x$ | $y$ |

The aforesaid adjustable orifice is here shown embodied in the metering valve illustrated in Fig. 3. Hydraulic fluid enters the valve housing 28 through inlet 29 and reaches the adjustable orifice through openings 31. The illustrative metering valve operates on a divided flow principle illustrated in my Patent 2,512,190 wherein only a small (but proportional) fraction of the flow passes through the metering orifice. The major fraction of flow (exactly proportional, for a given orifice size, to the metered flow) passes directly from inlet 29 through control ports 30 to port 32 in valve seat 19 (with very little pressure drop if desired), leaving the valve through outlet 33 connected with the operating cylinder as will presently more fully appear. Control orifices or ports 30 in relation to the effective size of orifice 18 divide the flow so that the flow to and through the metering orifice is exactly proportional to the major flow which passes directly to outlet 33 as aforesaid. Bypassing the major flow around the metering orifice simplifies construction, reducing the size of the valve over what it would have to be if all fluid passed through the metering orifice, and also increases the efficiency of the metering orifice 18. Adjusting the size of the metering orifice varies the volume of flow which by-passes through control holes 30 in inverse proportion to the effective size of the metering orifice, i.e. the smaller the metering orifice the gerater the volume of flow before the valve closes.

In operation, flow continues through port 32 until the small (proportional) fraction of the flow passing through the metering orifice displaces valve 17 sufficiently to seat it on seat 19 and close port 32 to all flow.

In the illustrative device, valve 17 is in the form of a piston 34 reciprocable in a cylindrical sleeve 35 mounted inside and spaced from housing 28 to leave a substantial annular fluid passage 36 around it and through which passes the main flow from inlet 29 to control holes 30.

The maximum capacity of the metering device in terms of volume of metered flow required for operating the given motor, depends on the ratio of the area of the metering orifice 18 to that of the control hole 30. The metering device can be adapted to any capacity of power unit simply by employing a size or number of control holes adequate to pass the maximum metered volume required. This can be effected either by using a cylinder 35 with the desired aggregate area of control holes or by drilling or enlarging the holes 30 to give the desired aggregate control hole area.

In cases where there is a substantial variation in viscosity of the hydraulic fluid, the metering device may be made insensitive to variations in such viscosity as described in my aforesaid patent, by proportioning the size, length and number of control holes 30 in relation to the properties of the metering orifice. Member 20 carrying port 21 is here shown in the form of a cylinder head for cylinder 35 and is seated against a shoulder 37 rabbeted inside cylinder 35. Orifice 18 is formed in a rotatable disc 38 (see also Fig. 6) bearing against the flat outer face of member 20 and closing port 21 except for that portion registering with orifice 18. A central stud 39 passing through and fastened to disc 38 and having a bearing member 41 seated in a bearing 42 in cylinder head 21, serves to rotate disc 38 and orifice 18 in relation to port 21. The operating shaft 43 passing through an appropriate packing in the cover 44 for housing 28, is provided with a slotted end 45 fitting over stud 39 and operatively connecting the shaft to disc 38. In this instance the shaft operating handle 46 carries a scale 47 which in conjunction with the index or pointer 48 on cover 44, indicates the effective orifice opening. The scale and index make it possible to adjust the orifice instantly to obtain a predetermined volume of flow.

It will be understood that other types of variable orifice valves may be employed to make predetermined adjustments of the effective orifice opening.

Return of piston valve 17 to its completely open position is preferably not retarded by flow through the metering orifice. Some form of check valve which opens only on return flow serves to by-pass the restricted metering orifice. Such check valve is provided in the present instance by permitting the disc to raise from contact with the face of head 20 under pressure of return flow. For this purpose the disc may be allowed to lift from contact with member 20 on reverse flow, or, as here shown, may be made thin and flexible and flex away from member 20 to open the return flow to the entire area of orifice 18, which as shown is substantially larger than the maximum effective metering orifice. In the present instance a washer 51 held in place by a spring retaining ring 52 bears against the outer margin of disc 38, serving to hold the disc and head 20 in place.

It will be apparent from the foregoing that the volume of flow through the metering device varies inversely with the effective size of the metering orifice, the smaller the orifice the slower the movement of the valve toward its cut-off port. Nevertheless, the change in volume of flow is advantageously proportional to the movement of the orifice adjusting member. While a proportional relation between orifice valve movement and volume of flow is not essential, it is nevertheless of great utility it permits quick and easy setting of the metering device for a given volume of flow and correspondingly quick and easy change to another predetermined volume of flow.

In the illustrative system shown in Fig. 1, pressure fluid is supplied to valve 16 and the system from reservoir 53 by pump 54. A 4-way selector valve 55 is advantageously employed for convenient operation of the system. The pump may be of the type having open center valves so that it may run continuously, or it may be started or stopped electrically upon and by actuation of the selector valve. The valve is connected to the pump by line 56, to the metering valve 16 by line 57, to the opposite end of cylinder 11 by line 58, and to the reservoir by line 59. A relief valve 60 is interposed in line 56 and connected to the output side of the pump to discharge excessive pressure to the reservoir through line 61. Preferably the relief valve is set to open only at pressures above normal operating pressure. Line 62 supplies cylinder 11 with metered volumes of pressure fluid.

Whether the metering valve 16 is connected in lines 57 and 62 as shown, or in line 58 (as shown in dotted lines at 63) depends on whether there is another force (e.g. gravity or otherwise) tending to move the piston or other motor in one direction. If so, the metering valve must be placed on the down-stream side of the power unit. For example, in the system of Fig. 1, if gravity or a load should tend to pull the piston 10 down, then the metering valve must be placed in the position shown at 63, down-stream of the power unit, where it meters the flow which leaves cylinder 11 and stops downward movement of the piston 10 at the desired point. If there be no such external force, the metering valve may be placed either in line 57 or 58.

Figure 2:
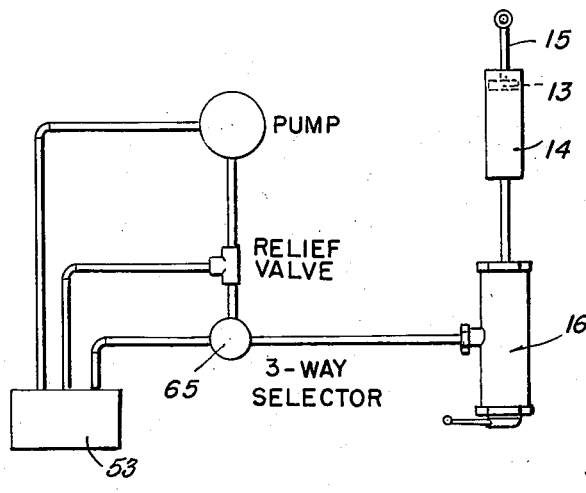
Fig. 2 is a diagram of another system in which the motor is a single acting piston and cylinder.

As previously indicated, a system embodying a single acting piston and cylinder may be used where there is a constant or ever present force (such as gravity) tending to move the piston in one direction. In such system, the metering valve should meter predetermined volumes of liquid into the cylinder (as shown in Fig. 2) if the predetermined movement is against (i.e. in a direction opposite 2) the direction of an ever present force, such as gravity. In this case, pump pressure prevents reverse movement under the action of the ever present force until the 3-way selector valve 65 is closed; and when closed the liquid trapped by the selector valve in the cylinder prevents reverse flow to the reservoir through the metering valve.

If the predetermined movement be in the opposite direction (i.e. in the direction of the ever present force) the metering valve should be reversed so as to meter predetermined volumes out of the cylinder.

As will appear from the foregoing, among other advantages in the invention makes possible: (1) simple remote control of an adjusting piston and cylinder or other hydraulic motor; (2) the ready adjustment of the stroke or amplitude of operation; (3) the locking by remote control of the piston or other motor in a predetermined position; (4) the ready change of the stroke or amplitude by remote control without impairing the automatic locking in the new or changed position; and (5) the reliable return of the piston or other motor to its predetermined operating position after each cycle of operations. When one compares the simplicity and ease of such control and its incidents with mechanical operation, control and locking, the great utility of the system is even more apparent.

Obviously the invention is not limited to the details of the illustrative embodiments herein shown and described, since these may be variously modified. Moreover it is not indispensable that all features of the invention be used conjointly since various features may be used to advantage in different combinations and sub-combinations.

Having described my invention I claim:

1. An adjustable liquid metering device for cutting off flow after passage of a predetermined volume of liquid comprising in combination a housing having inlet and discharge openings, a port between said openings through which the liquid passes, a piston valve in said housing movable by and in proportion to the flow through said housing to close said port to cut off further flow, after passage of a predetermined volume of flow, metering means between said openings including an orifice for passing flow to said valve to move the same toward said port at a rate proportional to the flow through said device, flow in the reverse direction moving said valve to fully open position, said metering means including a pair of members having relatively separable portions for varying the effective size of said orifice, one of said members having therein an opening serving as an orifice but substantially larger than the operative size of said orifice, the other member having therein an elongated slot substantially longer and larger than said orifice for controlling the effective size of said orifice, said slot progressively varying in width to vary the volume of liquid passing through said device in linear proportion to a relative movement of said members, said portions being in contact during normal metered flow which moves said valve toward said port but movable apart when reverse flow through said device moves said valve toward fully open position to open the entire area of said orifice to reverse flow.

2. Apparatus for controlling the extent of movement of a hydraulic motor actuated by a source of hydraulic pressure fluid comprising in combination an elongated valve body having therein a passage and a port through which flow to the motor passes, a valve piston having a constant stroke in said body and movable by flow toward said port at a rate proportional to flow through said passage, adjustable orifice means in said body for varying the rate of valve moving flow and thereby the volume of flow passing through said metering device before said valve closes said port, said orifice means comprising relatively rotatable members one having therein an opening serving as said orifice and the other an elongated slot variably registering with said opening, said slot progressively varying in width to vary the effective size of said orifice progressively with relative movement of said member.

3. Apparatus for controlling the extent of movement of a hydraulic motor comprising in combination a valve body having therein a passage and a port through which hydraulic flow passes to actuate the motor, a valve in said body having a constant stroke and movable by flow toward said port at a rate proportional to flow through said passage to cut off further flow through said passage, adjustable orifice means for regulating said valve moving flow, said orifice means comprising relatively rotatable members one having therein an opening serving as said orifice and the other an elongated slot variably registering with said opening, said slot progressively varying in width to vary the effective size of said orifice progressively with the relative movement of said members.

4. Apparatus for controlling the extent of movement of a hydraulic motor comprising in combination a valve body having therein a passage and a port through which hydraulic flow passes to actuate the motor, a valve in said body having a constant stroke and movable by flow toward said port at a rate proportional to flow through said passage to cut off further flow through said passage, adjustable orifice means for regulating said valve moving flow, said orifice means comprising relatively rotatable members having openings therein adapted variably to register to change the effective size of the orifice, said members having uniform increments of relative rotative movement and said openings being constructed and arranged to vary flow of air through by uniform instruments corresponding to the increments of movement of said members.

References Cited in the file of this patent

UNITED STATES PATENTS

| | | |
|---|---|---|
| 1,768,305 | Bentley | June 24, 1930 |
| 2,254,253 | Williams | Sept. 2, 1941 |
| 2,268,733 | Williams | Jan. 6, 1942 |
| 2,397,103 | Haberstump | Mar. 26, 1946 |
| 2,423,920 | Yanchenko | July 15, 1947 |
| 2,531,480 | Sparklin | Nov. 28, 1950 |
| 2,541,464 | Davies | Feb. 13, 1951 |
| 2,572,950 | Rider | Oct. 30, 1951 |
| 2,664,106 | Livers | Dec. 29, 1953 |
| 2,796,080 | Presnell | June 18, 1957 |